United States Patent [19]

Rumold

[11] Patent Number: 5,081,571
[45] Date of Patent: Jan. 14, 1992

[54] FEEDBACK-FREE OUTPUT CIRCUIT CONFIGURATION

[75] Inventor: Gerhard Rumold, Bubenreuth, Fed. Rep. of Germany

[73] Assignee: Siemens Aktiengesellschaft, Berlin and Munich, Fed. Rep. of Germany

[21] Appl. No.: 448,719

[22] Filed: Dec. 11, 1989

[30] Foreign Application Priority Data

Dec. 22, 1988 [EP] European Pat. Off. ........ 88121519.8

[51] Int. Cl.⁵ .................. G05B 9/02; H02J 15/00
[52] U.S. Cl. ...................... 364/184; 364/492
[58] Field of Search ............ 363/65, 19, 49, 78; 455/607, 613, 612; 307/85, 11, 43, 149, 150, 151, 115, 116, 140; 361/96, 193; 364/200 MS File, 900 MS File, 184, 131–147, 492, 493, 483

[56] References Cited

U.S. PATENT DOCUMENTS

| 4,167,786 | 9/1979 | Miller et al. ............... 364/493 |
| 4,176,401 | 11/1979 | Lonberger ................. 455/613 |
| 4,335,445 | 6/1982 | Nercessian ................ 364/900 |
| 4,338,647 | 7/1982 | Wilson et al. .............. 361/96 |
| 4,420,841 | 4/1983 | Dudash ..................... 455/607 |
| 4,460,951 | 7/1984 | Fenter et al. .............. 363/49 |
| 4,504,927 | 3/1985 | Callan ....................... 364/900 |
| 4,507,703 | 3/1985 | Blau et al. ................. 307/115 |
| 4,573,112 | 2/1986 | Numata et al. ............. 363/19 |
| 4,638,178 | 1/1987 | Kayser ...................... 307/149 |
| 4,652,769 | 3/1987 | Smith et al. ............... 307/85 |
| 4,745,540 | 5/1988 | Hamada et al. ........... 364/140 |
| 4,771,403 | 9/1988 | Maskovyak et al. ....... 364/900 |
| 4,774,656 | 9/1988 | Quatse et al. ............. 364/900 |
| 4,829,596 | 5/1989 | Barina ...................... 455/612 |

FOREIGN PATENT DOCUMENTS

| 0278802 | 8/1988 | European Pat. Off. . |
| 3519826 | 12/1985 | Fed. Rep. of Germany . |
| 2547075 | 12/1984 | France . |
| 8000381 | 3/1980 | United Kingdom . |
| 2159982 | 12/1985 | United Kingdom . |

*Primary Examiner*—Jerry Smith
*Assistant Examiner*—Jim Trammell
*Attorney, Agent, or Firm*—Kenyon & Kenyon

[57] ABSTRACT

An output circuit with a controller and intelligent output stages for process control where the output stages are supplied with power from separate voltage sources which are electrically separated from each other. The actuating commands from the controller for semiconductor switches in the output stages and feedback signals to the controller from the output stages are carried back and forth via optical couplers. Each output stage receives its own direct current supply, which is obtained by rectifying a chopper current supply. The feedback signals are transmitted serially being clocked by pulses derived from the chopper current supply. Thus, actuating commands may be issued without retrospective effect. Switching operations may be carried out during the process. Diagnostic signals concerning the load current circuit can provide feedback efficiently.

13 Claims, 4 Drawing Sheets

FEEDBACK-FREE OUTPUT CIRCUIT CONFIGURATION

FIELD OF THE INVENTION

This invention relates to an output circuit configuration comprising individual output stages which contain power semiconductor switches that can be actuated by a controller and are provided with devices to feed diagnostic signals back to the controller.

BACKGROUND OF THE INVENTION

An output system comprising "intelligent" output stages is found in DE-OS 35 19 826 and is employed in the operation of final controlling elements in industrial processes and equipment. A "controller" is a device comprising a central processing unit (CPU), a storage unit, and a power supply. The CPU includes a data processor to execute a stored operating sequence. The storage unit stores this operating sequence as well as data referring to the input/output status.

SUMMARY OF THE INVENTION

Final controlling elements are often actuated during control of a process. These controlling elements differ considerably in terms of voltage type and magnitude, from the actuating system and from each other. The present invention efficiently provides absolute, electrically-isolated switching for the final controlling elements in an output system of the type described above, so that neither the switching operation itself, its introduction, nor feedback from diagnostic signals to the controller can in any way influence the electric potential between the control system and process or between the individual final controlling elements. The output circuit configuration of the present invention allows final controlling elements to operate in arbitrary circuits without interaction.

DETAILED DESCRIPTION OF THE DRAWINGS

Figure 1:
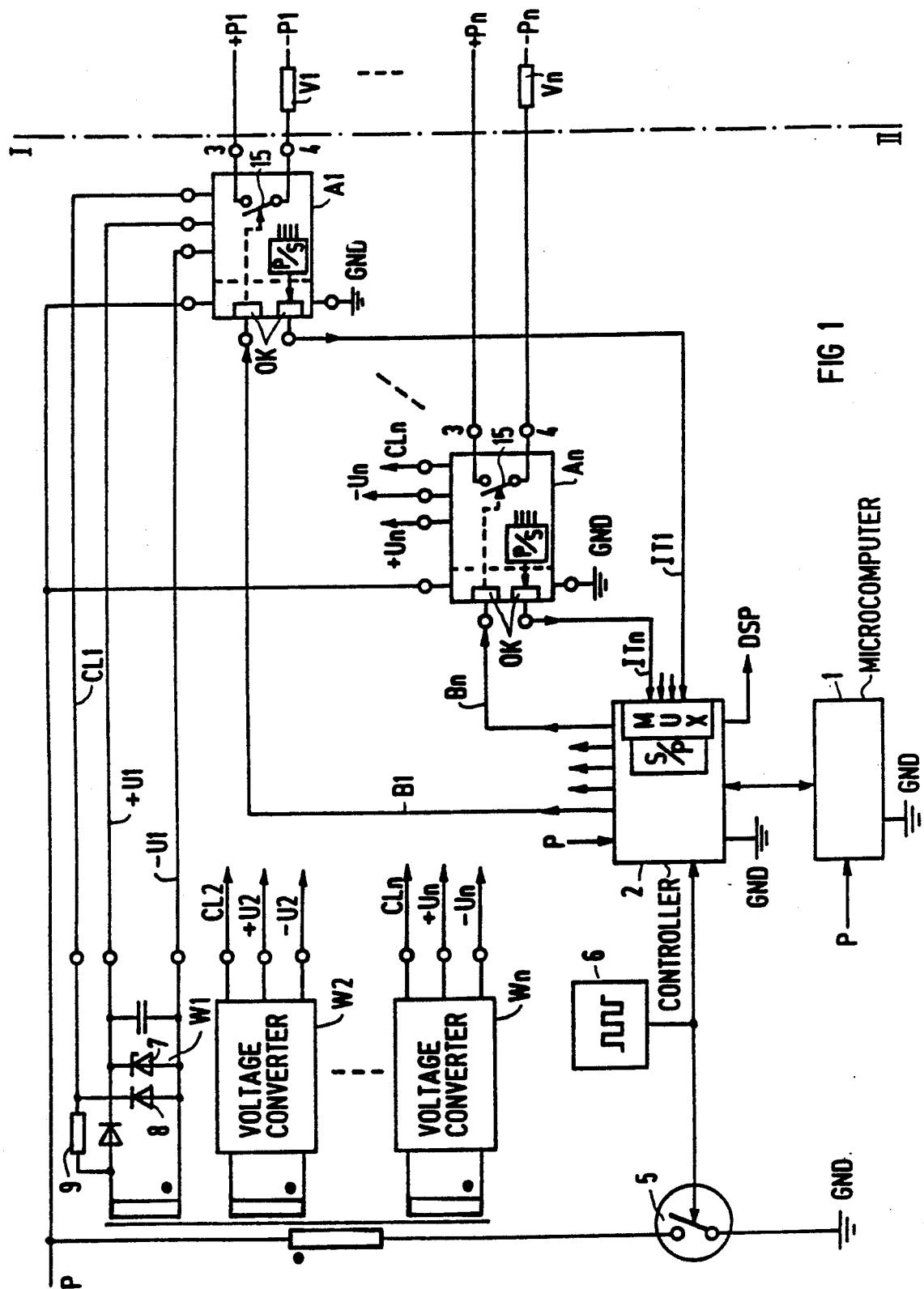
FIG. 1 is a block diagram of the output circuit configuration in connection with a controller, constructed according to an embodiment of the invention.

Referring to FIG. 1, output stages A1..An are shown in block diagram form. The output stages A1..An are part of a control system comprising a microcomputer 1 and an output controller 2. The control system is shown to the left of the dashed line connecting points I and II in FIG. 1. The output leads 3, 4 for the individual output stages A1..An are jumpered by power semiconductor switches 15 shown schematically and allow the process final control elements V1..Vn to be switched on and actuated with voltage potential +P1..+Pn. The process final control elements V1..Vn can be magnetic coils, motors, protective devices, electrohydraulic valves or similar items. The semiconductor switches for the individual output stages A1..An are controlled by leads B1..Bn. Leads B1..Bn of the output controller 2 are controlled by the program stored in the microcomputer 1. Leads B1..Bn are coupled to the output stages A1..An via optical couplers OK.

Diagnostic signals are collected within the individual output stages A1..An. These diagnostic signals contain information on the status of the switched output electric circuit and/or the power semiconductor switch. The individual output stages A1..An send these diagnostic signals back to the output controller 2 via a parallel/serial converter P/S and an optical coupler OK. These diagnostic signals are serially transmitted in the form of pulse trains on leads IT1..ITn and are coupled to the inputs of a multiplexer MUX located in the output controller 2. The output controller 2 relays the diagnostic signals to a serial/parallel converter so that they can then be processed in parallel in the output controller 2 or the microcomputer 1. The serial transmission of diagnostic information requires only one optical coupler for a variable number of diagnostic signals per output stage. The cost of using these relatively expensive optical coupler devices is reduced.

Figure 1A:
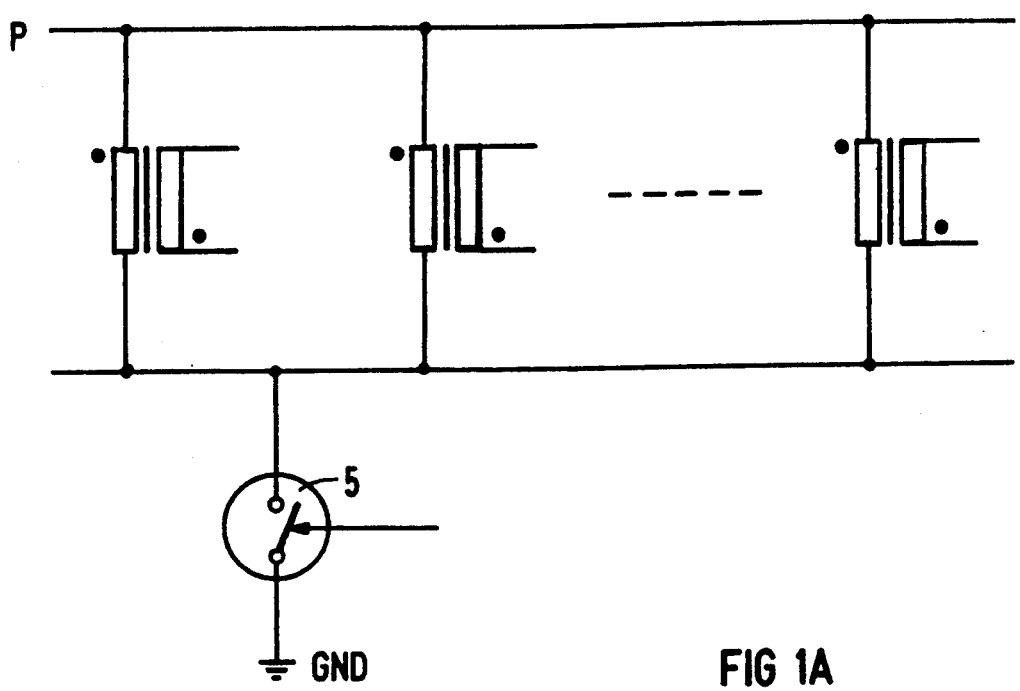
FIG. 1A is a circuit diagram of separate primary and secondary windings for the output circuit configuration, constructed according to an embodiment of the individual.

A chopper power supply is provided for the output stages A1..An with separate d.c. voltage converters W1..Wn, i.e. flyback converters, for electrical isolation. The d.c. voltage converters W1..W2 are supplied by secondary windings which are wrapped around a common core and share a common primary winding. The primary winding is coupled in series with a semiconductor switch 5 between the system's operating potential P (i.e., +5 V) and the system ground GND. The switch 5 is actuated by a clock pulse generator 6 (i.e., frequency of 20 kHz), so that the operating voltage potential P after conversion to alternating current and a voltage change through a respective transformer winding is converted into the direct voltage potentials $+U_1$, $-U_1..+U_n$, $-U_n$ which are electrically isolated from the switch 5. To ensure a constant voltage supply, the outputs of the individual d.c. voltage converters W1..Wn, are limited by means of a Zener diode 7. For more demanding requirements, special voltage regulation devices are needed. To conserve space it is practical to provide d.c. voltage converters W1..Wn with separate primary and secondary windings as shown in FIG. 1A instead of a common core and a common primary winding. To conserve space, the primary windings should be placed so that they are pulsed in parallel by the switch 5.

A diode 8 and a resistor 9 are coupled to the secondary windings of the d.c. voltage converters W1..Wn. The signals from the diode 8 and the resistor 9 form pulse signals CL1..CLn. These pulse signals CL1..CLn are in phase with the pulse signal of the clock-pulse generator 6 and are fed to the corresponding output stages A1..An. The pulse signals CL1..CLn are used in the conversion and serial output of the diagnostic information that is input in parallel to the parallel/serial transformer P/S. Using the pulse from the chopper electrical supply to transfer data, makes the preparation of a dedicated pulse signal source unnecessary.

Referring to FIG. 1, by using optical couplers OK, no unwanted interference arises in the process circuit being switched. Unwanted interference is excluded in all signals to and from the control systems. These signals include the command inputs B1..Bn, the feedback trains IT1..ITn, the electric isolation of the supply voltages $+U1$, $-U1..+Un$, $-Un$, and the pulse signals CL1..CLn.

Figure 2:
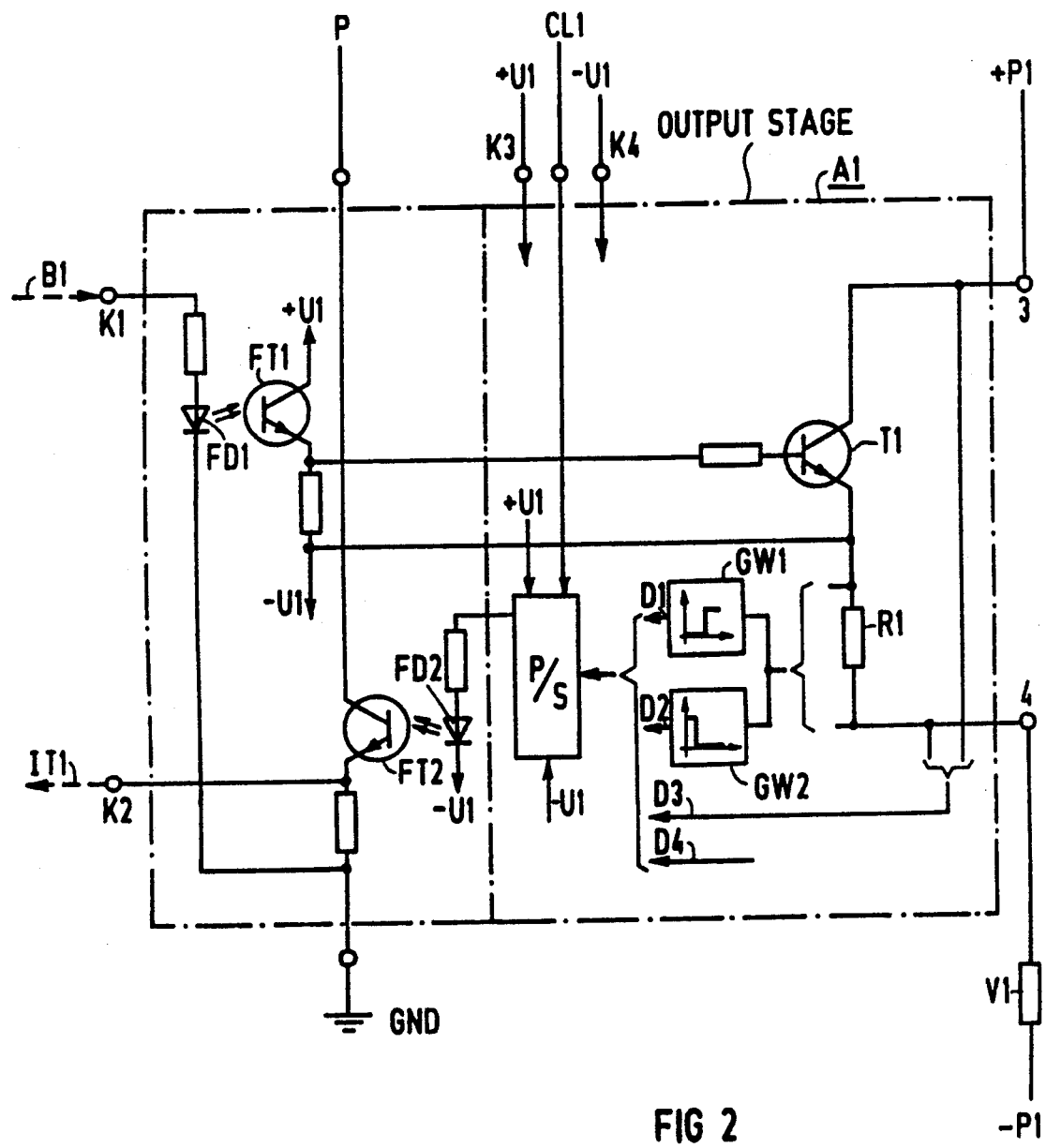
FIG. 2 is a detailed block diagram of the internal structure of a single output stage, constructed according to an embodiment of the invention.

Referring to FIG. 2, output stage A1 is shown in finer detail as an example of the inner structure of output stages A1..An. Both optical coupling devices (marked in FIG. 1 as OK) are shown in the left portion of FIG. 2. Each optical coupler comprises a light emitting diode FD1, FD2 as well as its corresponding phototransistors FT1, FT2. Whenever the output controller 2 issues a command B1 to close the semiconductor switch T1, the operating potential p is coupled to the input terminal K1, which corresponds to a high signal. The photodiode FD1 begins to conduct and controls the phototransistor FT1 coupled to potential $+U1$. The photodiode FD1 is electrically isolated from the operating potential P. A base current is driven from this separate voltage source $+U1$ through the power transistor T1 and causes the power transistor T1 to conduct current through to the ultimate consumer V1. The base current required to force the transistor T1 into a conducting state is done independently of the potential conditions in the load circuit.

Conversely, the light-emitting diode FD2 is supplied with pulses of voltage $+U1$ via the parallel/serial transformer P/S. The light-emitting diode FD2 controls its assigned phototransistor FT2 so that the operating potential P or the ground GND alternately appears at its emitter and at the output terminal K2 during the appropriate clock pulse. The optical coupling device, which comprises photodiodes FD1, FD2 as well as phototransistors FT1, FT2, can be integrated in the output stage A1 or operated separately.

A series of diagnostic signals (i.e. D1..D4), are prepared in output stage A1 which contain information on the switching status of the load circuit. Resistor R1 is serially coupled to the power transistor T1. The voltage across shunt resistor R1, which is proportional with the load current, is fed into two threshold indicators GW1, GW2. The threshold indicator GW1 in turn emits a high signal whenever the value of the load current exceeds a specified maximum value, whereas the threshold indicator GW2 emits a high signal whenever the load current falls below a specified minimum value. In a similar manner, other diagnostic signals, which are typical for the operating status of the load circuit, can be produced from the voltage across the switching transistor T1.

Furthermore, it can be determined whether the temperature of the switching transistor has surpassed a maximum allowable value by using a temperature sensor. Voltages $+U_1$ and $-U_1$ are coupled to the current supply terminals K3 and K4 and are coupled to all of the sensor and comparator elements used to prepare the diagnostic signals. These voltages are independent of the system's operating potential P and the voltage potentials prevailing during the process. The diagnostic signals D1..D4 which are in parallel are fed to a parallel/serial transformer P/S. The parallel/serial transformer P/S continuously outputs the applied diagnostic signals to the optical coupler FD2, FT2 in synchronization with the pulse signal CL1.

Figure 3:
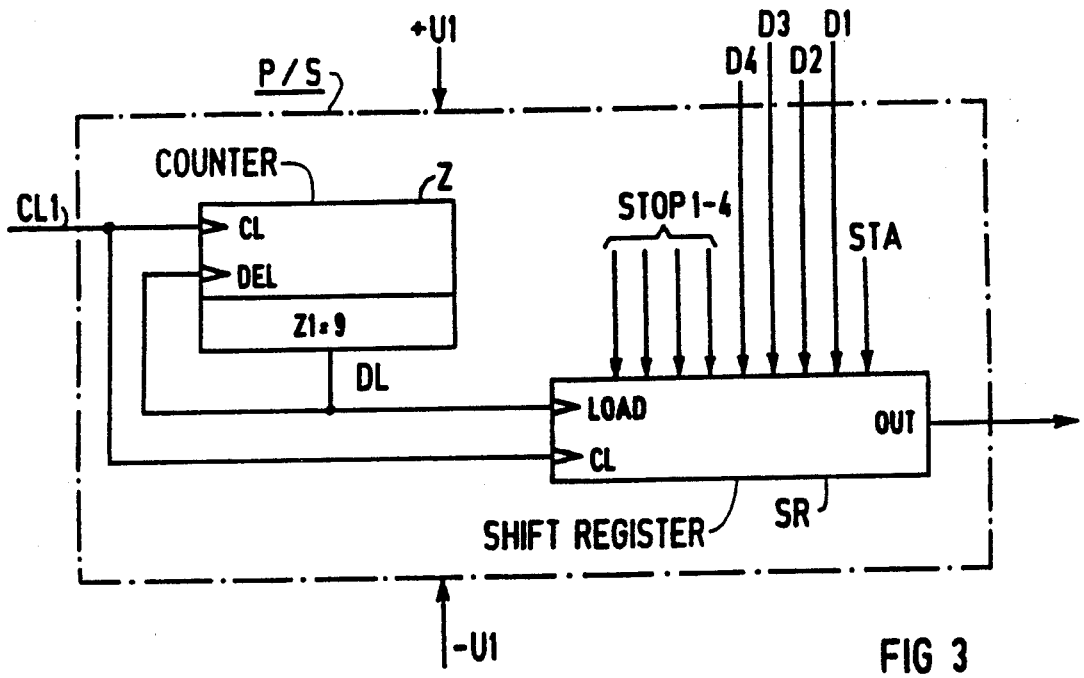
FIG. 3 is a block diagram of a parallel/serial transformer used in an output stage, constructed according to an embodiment of the invention.

Referring to FIG. 3, a block diagram of the parallel/serial transformer P/S is shown. The parallel/serial transformer P/S comprises a shift register SR with nine stages. Four stages are for a set of one-bit diagnostic signals D1..D4. Four more stages are for the timing "stopbits". One additional stage is for the start-pulse, which is used to signal the beginning of a pulse train. The stopbits are always at low signal voltage levels. The start pulse bit is always at a high signal voltage level. The diagnostic bits D1..Dn are set at levels according to the current operating condition. Whenever the rising edge of a pulse DL appears at the load input of the shift register SR, the parallel data at the inputs of the shift register SR (i.e. stopbits, D1..D4 and the start-pulse bit) are loaded into the shift register SR. The succeeding pulses from pulse signal CL1 causes this data to be read out serially bit by bit, beginning with the start pulse bit and ending with the last stopbit. Furthermore, a counter Z is provided, which is incremented with each pulse signal CL1. The counter Z is incremented from zero up to a value Z1 which corresponds to the length of the pulse train (i.e., in this case 9). When the counter Z reaches Z1 the counter is reset when the pulse D1 appears at the DEL input. The transfer of parallel data into the shift register SR and the completion of the serial output of its contents at output OUT occurs at the same time that the counter Z is reset. Because they occur at the same time, the diagnostic signals D1..D4 are continuously transmitted via the optical coupling device to the output controller 1, and from there they can be evaluated in the usual manner.

Figure 4:
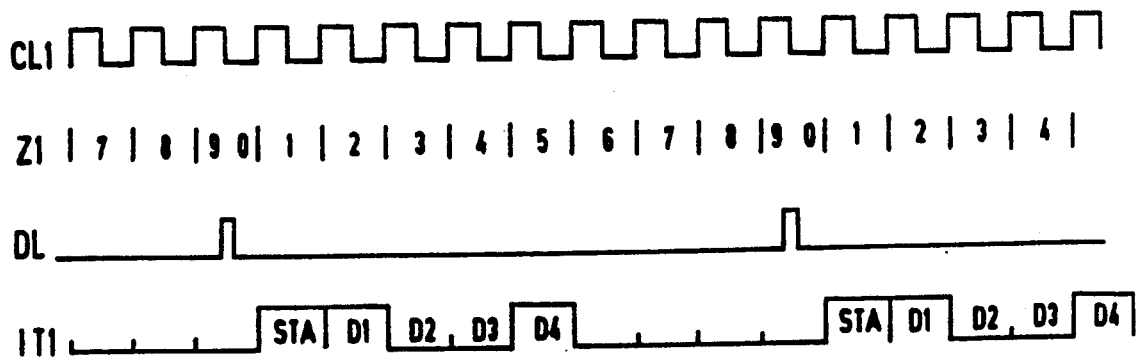
FIG. 4 is a timing diagram for the serial transmission of the diagnostic signals to the controller, according to an embodiment of the invention.

Referring to FIG. 4, the timing diagram of the device depicted in FIG. 3 is shown. The timing diagram shows the clock pulse CL1, the current counter status Z1 of the counter Z, and the reset/load pulse DL. Also shown is the pulse pattern of an arbitrary combination of diagnostic signals D1..D4.

What is claimed is:
1. An output circuit configuration comprising:
   a) a plurality of individual output stages each including a power semiconductor switch having a control input to receive inputs from a controller and devices to feed diagnostic signals back to said controller;
   b) a power supply for the output stages providing a separate voltage source to each output stage, said voltage sources electrically isolated from each other; and
   c) optical couplers at each output stage for the transmission of actuating commands to the control input of the semiconductor switches and of feedback signals to the controller.
2. The circuit configuration of claim 1, wherein said power supply includes a plurality of high-frequency, pulsed d.c. voltage converters to supply power to the individual output stages.
3. The circuit configuration of claim 2, wherein said voltage converters include:
   at least one primary winding and a plurality of secondary windings, one allocated to each individual output stage, said secondary windings producing pulse signals;
   means for picking said pulse signals off said secondary windings; and
   means to feed the diagnostic signals from the individual output stages back to the output controller serially in synchronization with said pulse signals.
4. The circuit configuration of claim 3, wherein said power supply includes a separate primary winding for each d.c. voltage converter assigned to an individual output stage, said primary windings coupled in parallel; and a common switch switching a current though said primary windings at the same time.

5. The circuit configuration of claim 4, wherein each d.c. voltage converter includes a rectifier circuit and further including a Zener diode that limits the output voltage of the d.c. voltage converter.

6. The circuit configuration of claim 3, wherein said power supply includes a single primary winding and a plurality of secondary windings equal to the number of output stages.

7. The circuit configuration of claim 6, wherein each d.c. voltage converter includes a rectifier circuit and further including a Zener diode that limits the output voltage of the d.c. voltage converter.

8. The circuit configuration of claim 3, wherein said means to feed comprise a parallel/serial converter located in the output stage including:

a shift register having a plurality of parallel data inputs, a load input, a shift input and a serial output;

a counter having a count input, a reset input, and an output occurring when a predetermined count equal to the number of stages in said shift register is reached, said output coupled to said load input and said reset input, and said pulse signal coupled to said count input and said shift input, whereby said parallel/serial converter is loaded in parallel and subsequently is read out in serial.

9. The circuit configuration of claim 8, wherein data loaded in parallel into a shift register includes diagnostic signal bits, an at least equal number of stopbits, and one start bit.

10. The circuit configuration of claim 2, wherein said power supply includes a separate primary winding for each d.c. voltage converter assigned to an individual output stage, said primary winding coupled in parallel; and a common switch switching a current though said primary windings at the same time.

11. The circuit configuration of claim 10, wherein each d.c. voltage converter includes a rectifier circuit and further including a Zener diode that limits the output voltage of the d.c. voltage converter.

12. The circuit configuration of claim 2, wherein said power supply includes a single primary winding and a plurality of secondary windings equal to the number of output stages.

13. The circuit configuration of claim 12, wherein each d.c. voltage converter includes a rectifier circuit and further including a Zener diode that limits the output voltage of the d.c. voltage converter.

* * * * *